Sept. 27, 1938.  E. BOECKING  2,131,469
DRIVE MECHANISM FOR MOTION PICTURE PROJECTING MACHINES
Filed Oct. 8, 1934  2 Sheets-Sheet 1
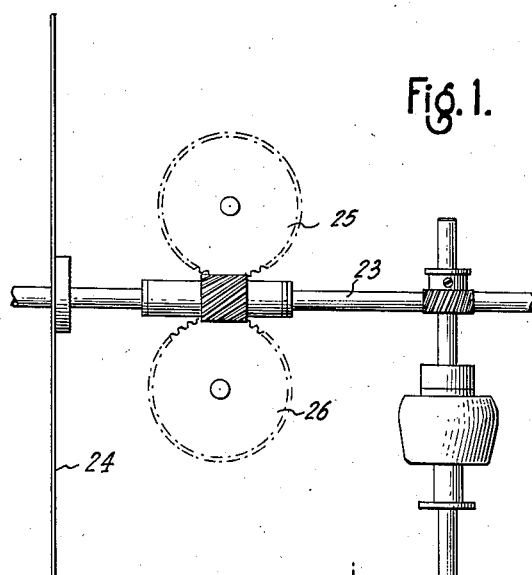
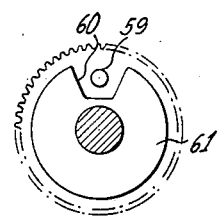
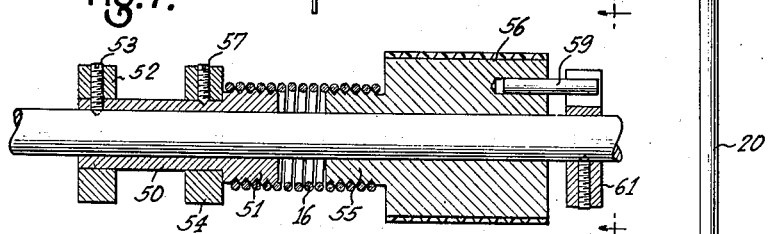
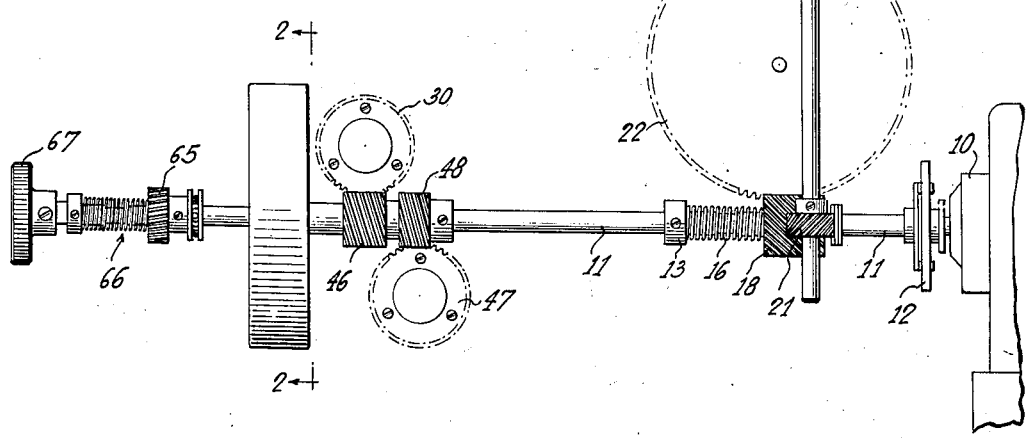
INVENTOR
Ewald Boecking
BY Austin & Dix
ATTORNEYS Sept. 27, 1938.  E. BOECKING  2,131,469
DRIVE MECHANISM FOR MOTION PICTURE PROJECTING MACHINES
Filed Oct. 8, 1934  2 Sheets-Sheet 2

INVENTOR
Ewald Boecking
BY Austin + Dix
ATTORNEYS

Patented Sept. 27, 1938

2,131,469

UNITED STATES PATENT OFFICE 2,131,469

DRIVE MECHANISM FOR MOTION PICTURE PROJECTING MACHINES

Ewald Boecking, Brooklyn, N. Y., assignor to International Projector Corporation, New York, N. Y., a corporation of Delaware Application October 8, 1934, Serial No. 747,323

2 Claims. (Cl. 271—2.3)

This invention relates to improved drive mechanism especially adapted for talking motion picture machines. More particularly, the invention relates to film feeding mechanism which is especially useful in connection with the projection of pictures and the reproduction of sound from a single film containing both picture and sound records, the film being fed intermittently through one portion of the machine to project the pictures and at constant speed through another portion to reproduce the sound. However, the invention is not limited to this particular use inasmuch as it may be useful in other situations, such as in sound recording or printing apparatus, in connection with motion pictures or otherwise.

A feature of the present invention resides in the provision of drive mechanism which enables the various parts which feed the film to be driven from a single main shaft, while avoiding the transmission of vibrations to the portion of the film in the sound conversion zone, and which at the same time is simple and inexpensive to manufacture, compact in size, and light in weight.

A further feature of the invention resides in the provision of such mechanism which is particularly suitable for use in portable motion picture projecting machines and which contains a minimum number of simple and efficient parts.

A more specific feature is the provision of a single main drive shaft operatively associated with novel filtering means adapted for one thing to prevent the transmission of vibrations from the main shaft to constant speed means for feeding the film through the sound reproduction zone, and/or for another thing to relieve the main shaft of vibrations due to other portions of the film feeding mechanism. A particular feature thus resides in doubly filtering such latter vibrations in order to relieve the film in the sound reproducing zone from them.

Another feature of the invention lies in the provision of improved and simplified filtering devices, and in certain details thereof.

Other features, objects and advantages of the present invention will in part be pointed out and will in part become apparent in connection with the following detailed description of an illustrative embodiment of the invention, reference being had to the accompanying drawings wherein:

Figure 1 is a front elevation of one form of mechanism in accordance with the invention, partly broken away and partly diagrammatic;

Fig. 7 is a view similar to Fig. 6 but showing a modified form of filter, also in accordance with the invention; and Fig. 8 is a vertical section taken through the right hand end of the gear of Fig. 7.

Referring first to Fig. 1 of the drawings, an electric motor 10 of any common or suitable type is provided for driving a main shaft 11. If desirable a resilient or yielding device 12 of any satisfactory or known type may be interposed between the motor and shaft 11 for preventing the transmission of vibrations from the motor to this shaft. The shaft 11 may be supported for rotation in convenient bearings (not shown).

Figure 5:
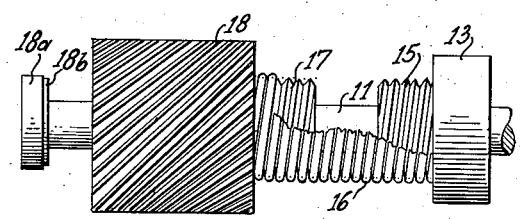
Fig. 5 is an enlarged rear elevation, partly broken away, of another portion of the construction shown in Fig. 1.
Figure 6:
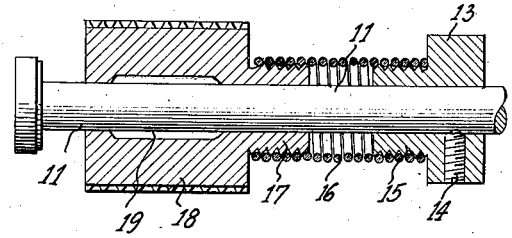
Fig. 6 is a longitudinal, vertical section through the construction shown in Fig. 5.

The main shaft 11 preferably drives intermittent mechanism for feeding the film through the picture projecting zone, as well as the shutter and the take up reel, and for filtering the vibrations of these parts from the main shaft, which also preferably drives the sound mechanism, a device of the following character is advantageous. For example, as best shown in Figs. 5 and 6, a collar 13 may be secured to shaft 11 as by a set screw 14 or other suitable fastening means. The collar may have a threaded portion 15 adapted to engage one end of a spiral spring 16, while the other end of this spring may be engaged with a threaded portion 17 of a gear 18 which is journalled on shaft 11. Where the shaft 11 is to rotate in a clockwise or right-hand direction, as viewed from the right hand end of Fig. 6, the spring 16 should be left-hand and the threads on portions 15 and 17 should be correspondingly arranged in order that during rotation of the shaft the tendency will be for the spring to be held in engagement with portion 15, and for the spring to maintain its engagement with portion 17. If the shaft rotates in the opposite direction, then the parts should be oppositely arranged to produce the result mentioned. That is to say, for a right-hand drive the spring is left-handed, and once the coils are threaded onto the end members, the flexure of the spring during rotation prevents the ends of the spring from being unscrewed. The spring is preferably constructed so that before assembly there is a clearance between successive coils sufficient to enable the effective length of the spring to shorten without the spring being driven solid under usual conditions encountered in motion picture machines. When the spring is of the usual small size for machines of this type and is made from a good grade of spring steel the clearance between successive coils may be about .005 inch, for example.

If desired, though it is not essential, a collar 18a, having a leather or other yielding pad 18b attached thereto, may be secured to shaft 11 to limit the travel of gear or worm 18, in case the torque produced by the driven parts tends to expand the spring excessively, in starting up.

The gear 18 may have a recess 19 for receiving grease or other lubricant, and preferably serves to drive a vertical shaft 20 through gear 21 and also to drive a large gear 22 for turning the take-up reel (not shown) on which the exhibited film is wound up. The shaft 20 may be supported in suitable bearings (not shown) and advantageously drives not only the shutter 24 but also gear 25 for feeding the film and gear 26 for operating suitable intermittent mechanism, such as Geneva gearing (not shown), for instance through shaft 23 and conveniently arranged gearing.

It will thus be appreciated that the single gear 18 drives all these parts and that any vibrations which are due to operation of these parts are effectively isolated from the shaft 11 by means of the resilient filter interposed between this shaft and the gear 18. The gear 18 being free to move lengthwise of the shaft, under control of the yielding spring, which is preferably under compression during operation, the transmission of jerks is minimized. Moreover, jolts incident to starting up are damped.

With reference now to Figs. 7 and 8, there is illustrated a form of construction which has certain advantages over the form shown in Figs. 5 and 6, particularly in that it is adjustable to vary the softness or stiffness of the spring 16. Such construction may comprise a sleeve 50 supported on shaft 11 and having an enlarged threaded portion 51. This sleeve may have a collar 52 integral therewith or secured thereto and may be fastened to shaft 11 by means of any suitable, releasable device such as set screws 53. A collar or similar device 54 may be mounted on sleeve 50 for travel between the enlarged portion 51 and the collar 52, while a set screw 57 may serve to hold collar 54 in end or any intermediate position. The spring 16 is assembled with threaded portion 51 on sleeve 50 and with a threaded portion 55 on gear or worm 56, as previously described in connection with Figs. 5 and 6, and operates similarly.

In Fig. 7 the spring is shown in a position of maximum softness, and when it is desired to employ a stiffer spring it merely becomes necessary to loosen set screws 53 and 57, thread the portion 51 into the spring 16 until fewer coils (possibly a single coil) are left between threaded portions 55 and 51, and then screw down the set screws with the member 54 abutting against the end of spring 16.

In order to relieve the spring 16 from undue strain or expansion, especially during starting up, the gear 56 may, if desired, have a pin 59 secured therein and arranged to lie, when at rest, in a slot 60 formed in a collar 61 which is secured to shaft 11 in any convenient manner. The width of the slot is sufficient to enable free play of the spring under normal operating loads, while the end walls of the slot are adapted to solidly drive the pin when loads in excess of normal are encountered.

Figure 2:
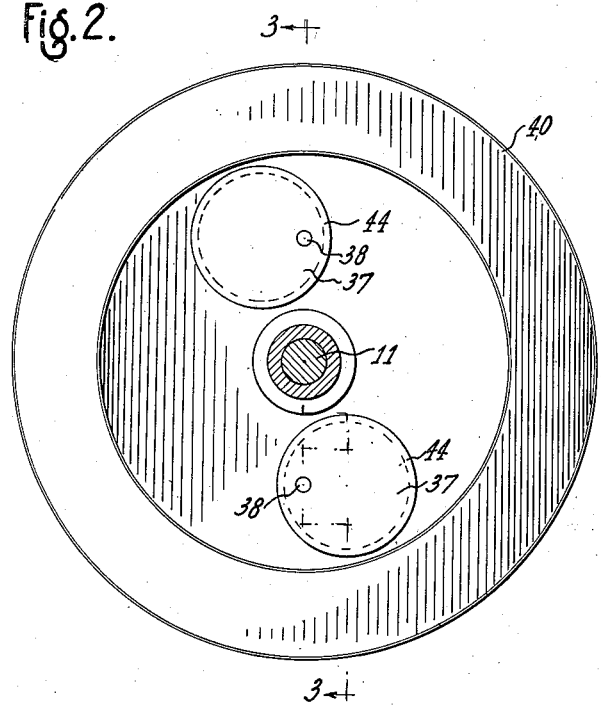
Fig. 2 is an enlarged vertical section of one portion of such mechanism, taken on the line 2—2 of Fig. 1, looking in the direction of the arrows.
Figure 3:
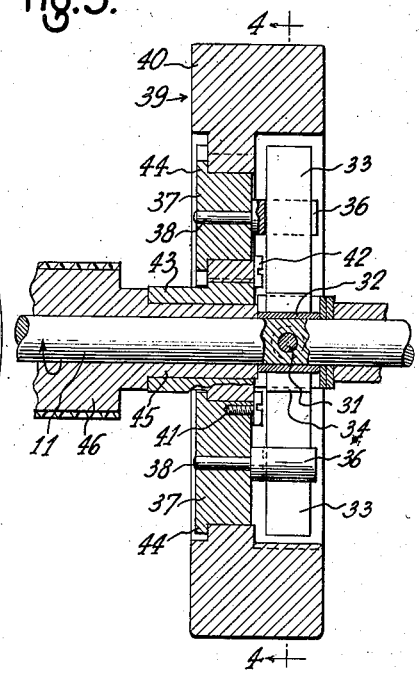
Fig. 3 is a sectional view taken on the line 3—3 of Fig. 2.
Figure 4:
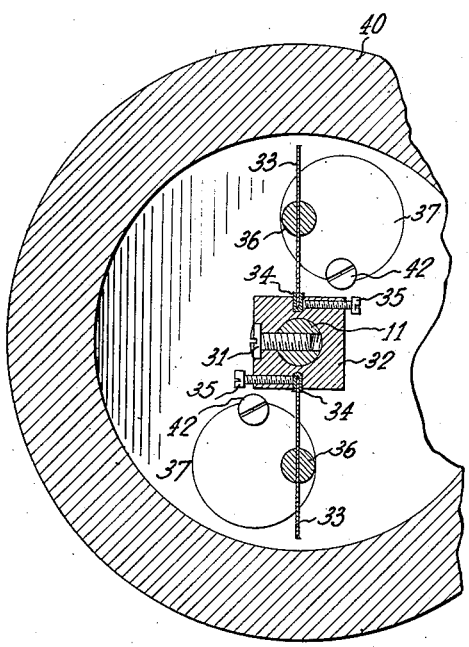
Fig. 4 is a vertical section taken on the line 4—4 of Fig. 3, and partly broken away.

As has been previously mentioned, the mechanism for feeding the film through the sound projection or reproducing zone is also preferably driven from the main shaft 11, and for this purpose a construction of the following character produces especially good results. The film passing through the sound reproduction zone should be driven at as perfectly constant a speed as is feasible, and hence the sound sprocket (not shown), which pulls the film past the sound gate (also not shown), should be isolated from vibrations caused by the operation of other parts. An example of superior mechanism for thus driving the sound sprocket, which may be connected in any satisfactory manner, preferably rigidly, to a gear 30, is illustrated in Figs. 2, 3 and 4.

With reference to these figures, the shaft 11 has firmly secured upon it, for instance by bolt 31, a collar 32 in which are seated the inner ends of one or more leaf spring members 33. Advantageously, a pair of opposed, thin, flexible, steel plates may serve as these spring members and may extend generally radially with their inner ends secured into U-shaped elements 34 which may be seated in appropriate grooves in collar 32 and be fastened in place by bolts 35. Outer portions of resilient members 33 are preferably engaged by the walls of slots formed in studs 36, which are pivoted in circular, flanged blocks 37 through pins 38 formed on or secured to the studs. The blocks 37 are snugly seated in openings in a rotatable member 39, preferably inwardly of its rim 40, and are symmetrically arranged with respect to its axis. The blocks are adapted to be turned to predetermined positions and locked in place by bolts 41, having heads 42 which abut against hub 43 of the rotatable member and maintain the blocks in operating position by holding their flanges 44 against the rotatable member. The hub 43 of this member 39 may be shrunk onto or otherwise secured to a sleeve 45 formed integral with a gear or worm 46 which is journalled on shaft 11.

It will be understood that the dampening effect produced by the construction may be varied by adjusting the effective length of the leaf spring members 33. This may be accomplished by simply loosening the bolts 42 and turning the members 37 in the proper direction to move the studs 36 inwardly or outwardly with respect to the axis of shaft 11. The studs are free to turn with respect to the members 37 and therefore should need no separate manipulation. When the proper resilience is secured in this way the bolts 42 are tightened down.

At this point, it may be remarked that while the types of filters disclosed are especially advantageous, simple and effective, other types of filters may be employed within the broader aspects of the invention viewed as a combination of various parts of the driving assembly.

Where desired a sprocket may be interposed between the sound sprocket and the take-up reel, and this sprocket may be driven through a gear 47 and a worm 48, secured to shaft 11, as disclosed in my copending application Ser. No. 714,571.

Where other parts of the machine, for instance a fan, are to be driven from shaft 11, there may be provided a gear 65 driven through a filter 66 which may be similar to the filter of which spring 16 is a part. A suitable knurled knob 67 may be secured to shaft 11 for enabling ready manual adjustment of the same.

Through the present construction there is thus provided a superior mechanism for motion picture machines, whereby vibrations are effectively prevented from reaching the sound device. Moreover, the construction enables the feeding of the film intermittently for the projection of pictures and continuously for the projection of sound by means of a single main drive shaft. At the same time, the vibrations due to the intermittent gearing and winding reel are doubly damped with respect to the film in the sound area. Moreover, the filters and cooperating parts are simple to manufacture, easy to assemble and adjust, and durable in service.

The present construction, moreover, tends to eliminate jolts due to starting up and hence serves not only as to filter vibrations under normal running but also in place of variable resistance connected with the motor, such variable resistance being undesirable where sound on film mechanism is employed.

The terms and expressions which have been employed are used as terms of description and not of limitation, and there is no intention, in the use of such terms and expressions, of excluding any equivalents of the features shown and described, or portions thereof, but it is recognized that various modifications are possible within the scope of the invention claimed.

What is claimed is:

1. In mechanism for translating a film having a sound track, a drive shaft, a driven member, a plurality of leaf spring elements, means carried by said shaft for engaging the inner ends of said leaf spring elements, a plurality of circular elements seated in said driven member, means carried by said circular elements for engaging said leaf spring elements, and means to lock said circular elements in given positions.

2. In a sound on film motion picture machine, means for moving a film through the machine for projecting the picture, and means for moving the film through sound reproducing mechanism including a driving member, a driven member, a plurality of leaf spring elements secured adjacent one end of one of said members, a plurality of adjustable means carried by the other of said members for engaging said spring elements at different points, said means comprising circular elements adapted to rotate with respect to the member which carries them, and means to lock the rotatable elements in any predetermined position.

EWALD BOECKING.